(12) United States Patent  (10) Patent No.: US 9,038,422 B2
Wanveer  (45) Date of Patent: May 26, 2015

(54) GLASS BLOWING APPARATUS AND METHOD OF MAKING GLASS OBJECTS

(76) Inventor: Aric Wanveer, Baltimore, MD (US)

( * ) Notice: Subject to any disclaimer, the term of this patent is extended or adjusted under 35 U.S.C. 154(b) by 182 days.

(21) Appl. No.: 13/555,570

(22) Filed: Jul. 23, 2012

(65) Prior Publication Data

US 2014/0020428 A1 Jan. 23, 2014

(51) Int. Cl.
*C03B 9/03* (2006.01)
*C03B 9/02* (2006.01)
*C03C 27/02* (2006.01)

(52) U.S. Cl.
CPC ... *C03B 9/03* (2013.01); *C03B 9/02* (2013.01); *C03C 27/02* (2013.01)

(58) Field of Classification Search
CPC ............ C03B 9/02; C03B 11/14; C03B 9/03; C03C 27/02; C03C 27/06; F16L 49/00
USPC ............................................................ 65/66
See application file for complete search history.

(56) References Cited

U.S. PATENT DOCUMENTS

| | | |
|---|---|---|
| 233,550 A | 10/1880 | Rosenzi |
| 268,162 A | 11/1882 | Wilson |
| 444,160 A | 1/1891 | Pitman |
| 976,796 A | 11/1910 | Gilligan |
| 1,535,168 A | 4/1925 | McCauley |
| 1,570,695 A | 1/1926 | Monro |
| 5,394,910 A | 3/1995 | Sweetland |
| 2003/0233848 A1 | 12/2003 | Janes |

FOREIGN PATENT DOCUMENTS

| | | |
|---|---|---|
| EP | 2225768 | 5/2012 |
| KR | 10-040844 | 12/2003 |

OTHER PUBLICATIONS

EngineeringToolbox, "Coefficients of Linear Thermal Expansion", Sep. 1, 2006, http://www.engineeringtoolbox.com/linear-expansion-coefficients-d_95.html, Accessed May 1, 2014.*
Warm Glass, "Summary of Coefficient of Expansion for Common Glasses and Metals", Jul. 9, 2001, http://www.warmglass.com/COESummary.htm, Accessed May 1, 2014.*
Glass Blowing Tools catalog by Putsch. 6 pages.

* cited by examiner

*Primary Examiner* — Cynthia Szewczyk
(74) *Attorney, Agent, or Firm* — Whiteford, Taylor & Preston, LLP; Joseph L. Morales

(57) ABSTRACT

An apparatus and method for manufacturing glass objects comprising a blowing glass blowing pipe and a metal mounting insert configured to melt with glass to form a glass piece that is easily removed from the glass blowing pipe without the need to break the glass from the headstock of the glass blowing pipe. A method for manufacturing a glass object utilizing a metal mounting insert is described. A glass object having a metal mounting insert for installation and use in other applications is also described.

12 Claims, 14 Drawing Sheets

GLASS BLOWING APPARATUS AND METHOD OF MAKING GLASS OBJECTS

BACKGROUND OF THE INVENTION

1. Field of the Invention

This invention generally relates to the field of glass object manufacturing and more specifically to an apparatus for blowing glass objects and a method for manufacturing glass objects utilizing the glass blowing apparatus.

2. Background

Glass blowing is an age old practice going back hundreds of years. The method of blowing glass objects requires a glass blowing pipe capable of withstanding extreme heat to the point that sand/silica becomes a molten soup. The headstock of the glass blowing pipe is placed in the crucible containing molten glass, gathering the molten glass on the headstock of the pipe and coating it with molten glass. The hot molten glass adheres to the head stock. The artisan then removes the molten glass from the container and blows it into shape. As the piece is blown, the artisan has to create a weak spot between the head stock and the piece of glass being made. Once the piece is completed, the artisan separates the finished piece from the headstock by breaking the glass at the weak spot. The breaking process makes it easy for the piece to break beyond the weak spot and requiring the artisan to start the process from the beginning and blow a new piece.

The prior art discloses various head stock pieces that can be detached from the glass blowing pipe and which allow the replacement of the head stock without the need to replace the entire pipe. See, for example, U.S. Pat. Nos. 233,550; 268,162; 444,160; 976,796; 1,535,168; and 1,570,695. The headstock attachments disclosed in the prior art, however, do not solve the problem that arises from the need to break the glass in order to finish the piece.

SUMMARY OF THE INVENTION

The present invention provides a solution to the above and other problems by enabling a method of blowing of glass objects without the need to break the object at a weak spot to separate it from the head stock of the blowing pipe.

It is one object of the present invention provide an insert for a glass blowing pipe that has a glass pipe attachment element and a glass object attachment element. Once the glass piece is blown, the insert becomes attached to the glass object and can be easily removed from the glass blowing pipe. The insert is utilized to attach the glass object to other components.

It is another object of the present invention to provide a method for making a glass object. The first step in the method is to coat the insert with molten glass. In the second step the glass piece is blown using a glass blowing pipe to which the insert is attached. In a third step, the glass piece is removed from the glass blowing pipe.

It is yet another object of the present invention to provide a kit for making glass objects comprising a glass blowing pipe and an insert. The kit may further include other elements that aid in the manufacture of glass pieces.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION

The invention summarized above and defined by the enumerated claims may be better understood by referring to the following description, which should be read in conjunction with the accompanying drawings and claims in which like reference numbers are used for like parts. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figures 1A, 1B:
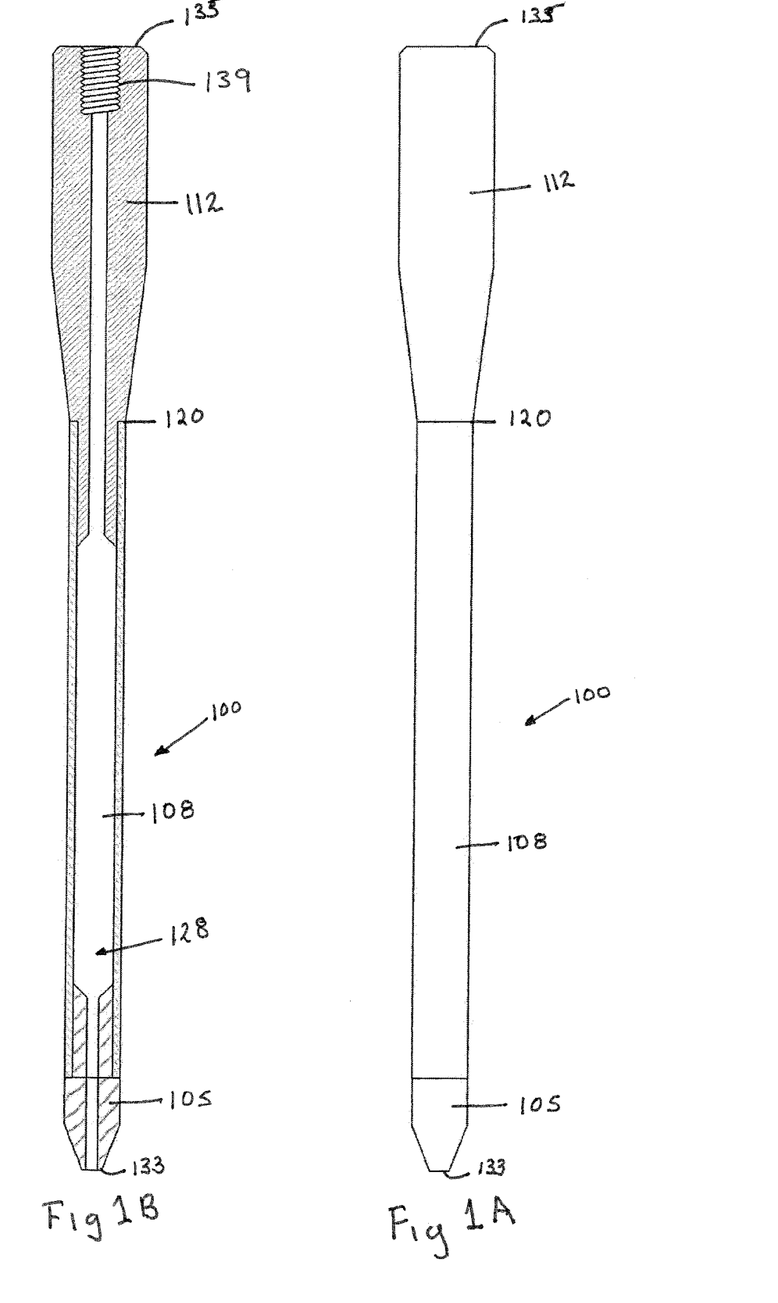
FIG. 1A is a side view of the glass blowing pipe in accordance with one object of the present invention, wherein the pipe does not have a metal mounting insert attached to it.
FIG. 1B is a sectional side view of the glass blowing pipe shown in FIG. 1A.

In an effort to avoid the above-described disadvantages, a glass blowing pipe 100 is provided, as shown on FIGS. 1A and 1B. The glass blowing pipe 100 has three sections: a mouth piece section 105, a pipe section 108, and a headstock section 112. The sectional view shown in FIG. 1B shows a more detailed view of the glass blowing pipe 100. The glass-blowing pipe 100 has an air channel 128 that runs from a distal end 133 at the end of the mouth piece section 105 through an insert end 135 of the headstock section 112.

Figure 2A:
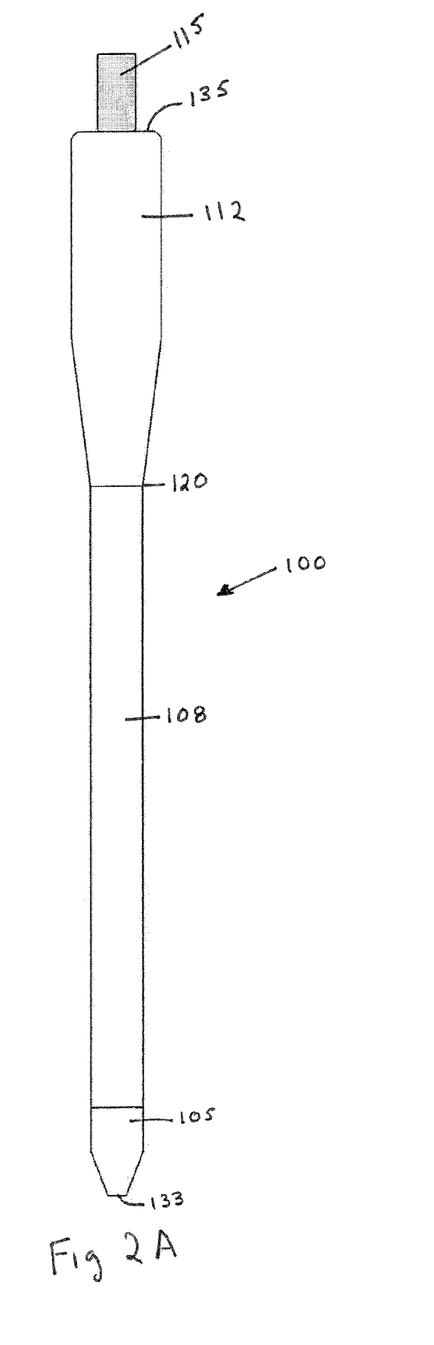
FIG. 2A is a side view of the glass blowing pipe in accordance with one object of the present invention with a metal mounting insert attached to it.
Figure 2B:
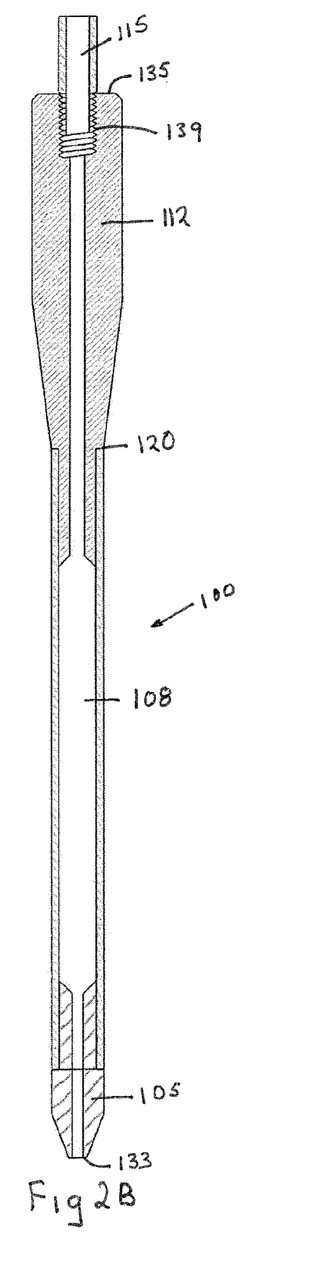
FIG. 2B is a sectional side view of the glass blowing pipe shown in FIG. 2.

The configuration of the transition between the pipe section 108 and the head stock section 112 is not critical to the present invention. In some embodiments, the head stock section 112 is merely the end of the glass blowing pipe 100 that is opposite of the mouth piece section 105, as shown on FIG. 1. In other embodiments, the headstock section 112 has a different configuration than the pipe section 108. The headstock section 112 may be thicker, have a different shape, have a different surface, or be modified in any manner known to a person of ordinary skill in the art. In yet other embodiments, the headstock section 112 is removable from the pipe section 108, as shown in the prior art. The headstock section 112 of the glass blowing pipe 100 has a pipe section end 120 and an insert end 135, which corresponds to the distal end of the headstock section as described above. The insert end 135 is configured to accept the metal mounting insert 115 as shown in FIGS. 2A and 2B.

Figures 3A, 3B:
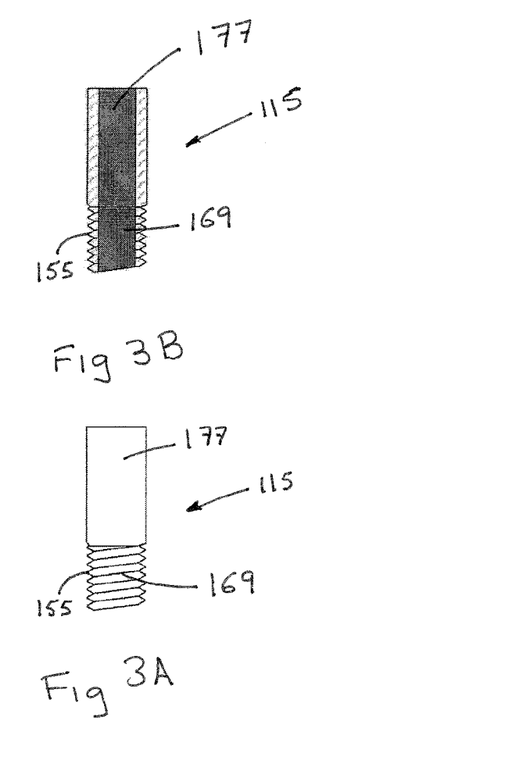
FIG. 3A is a side view of a metal mounting insert for use with the glass blowing pipe in accordance with one object of the present invention.
FIG. 3B is a sectional representation of the side view of FIG. 3A.
Figure 3C:
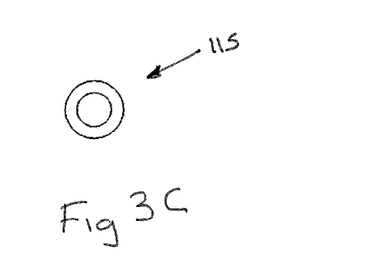
FIG. 3C is a top view of a metal mounting insert.
Figure 3D:
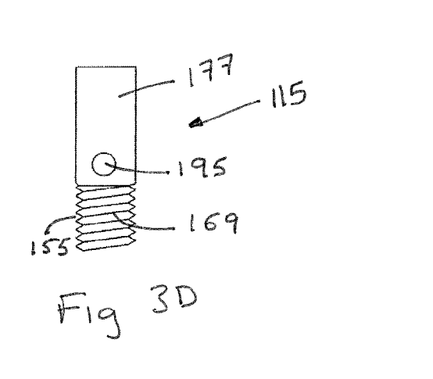
FIG. 3D is a side view of a metal mounting insert with a release element.

A metal mounting insert 115 is shown in FIG. 3. The metal mounting insert 115 is configured to attach to the headstock section 112 of the glass blowing pipe 100. In a preferred embodiment, the metal mounting insert 115 is removably attached to the headstock section 112. The metal mounting insert 115 as shown in FIGS. 3A through 3D, has two sections: a glassblowing pipe attachment element 169 and a glass object attachment element 177. In one preferred embodiment, as shown on FIG. 3D, the glassblowing pipe attachment element 169 comprises insert threads 155 that allow the metal mounting insert 115 to be removably attached to the glassblowing pipe 100. It is contemplated that the glassblowing pipe attachment element 155 is any type of release mechanism that allows tight fit between the glassblowing pipe 100 and the metal mounting insert 115, resulting in minimum loss of air at the joint 121 between the distal end 135 of the headstock section 112 and the metal mounting insert 115.

In one preferred embodiment, as shown on FIGS. 1A and 1B, the distal end 135 of the head stock section 112 has head stock threads 139 that match insert threads 155 on the metal mounting insert 115. The metal mounting insert 115 is screwed into the distal end 135 of the headstock section 112 as shown on FIGS. 2A and 2B. The metal mounting insert 115 fits tightly in the head stock section 112 with minimal air escaping through the joint 121 between the head stock section 112 and the metal mounting insert 115. It is contemplated that the metal mounting insert 115 can be mounted to the head stock section 112 by other methods that allow a tight fit that minimizes escape of air at the joint between the metal mounting insert 115 and the head stock section 112.

Figure 4A:
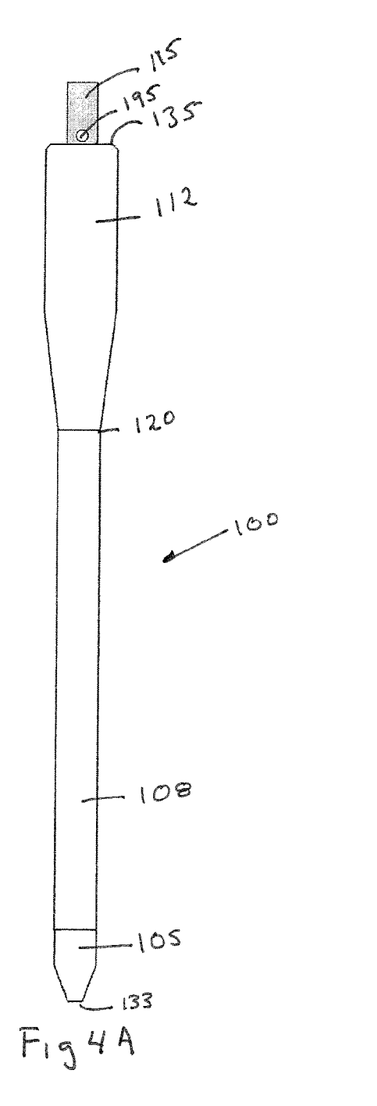
FIG. 4A is an illustration of the glass blowing pipe in accordance with one object of the present invention and the removal tool for removing a metal mounting insert having a release element.
Figure 4B:
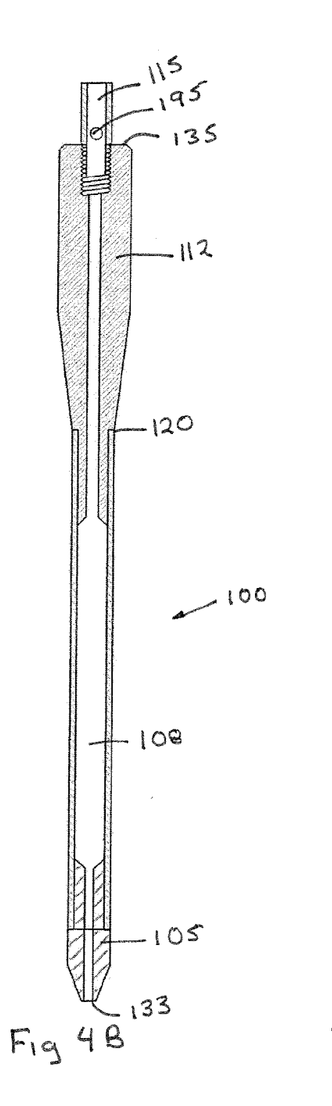
FIG. 4B is a sectional view of FIG. 4A.

In a further preferred embodiment, the metal mounting insert 115 has a release mechanism 195. The release mechanism 195, in some preferred embodiments, consists of an aperture on the metal mounting insert 115. The aperture is configured to allow a removal tool 400 as shown on FIG. 4, to be inserted and aid in removal of the metal mounting insert 115 from the glassblowing pipe 100. The removal tool 400 is turned counterclockwise to release the metal mounting insert 115 and the completed piece from the headstock section 112. In some embodiments, the metal mounting insert is released from the pipe by clamping and unscrewing it with a normal pair of locking pliers.

The metal mounting insert 115 is fabricated from a material that fuses and anneals with molten glass. Thus, the metal mounting insert 115 is made from a material that has a coefficient of expansion equal to the coefficient of expansion of glass. Some of the materials used include copper, silver, gold or a metal with similar properties. When the glass and metal are super-heated, as in the glassblowing process, the materials bond and fuse together. The heat causes the materials to expand beyond size at room temperature. Though the metal and glass are fused at high temperature the materials shrink as they cool. As the metal mounting insert cools with the glass the two materials shrink back to their room temperature size. The rate at which the material, e.g. copper, expands when heated and the rate at which glass expands when heated are nearly matched. So when it cools back to room temperature they shrink at the same rate as well. If the metal and glass did not expand and contract at the same rate the glass would shrink faster than the metal and burst apart or the metal would lose its bond to the glass and simply slide off. If the coefficients of expansion match the glass and copper are bonded at a molecular level at any temperature. As a result, the cooling process is well controlled to avoid issues that may arise with the difference in the material's expansion coefficients.

Figure 5:
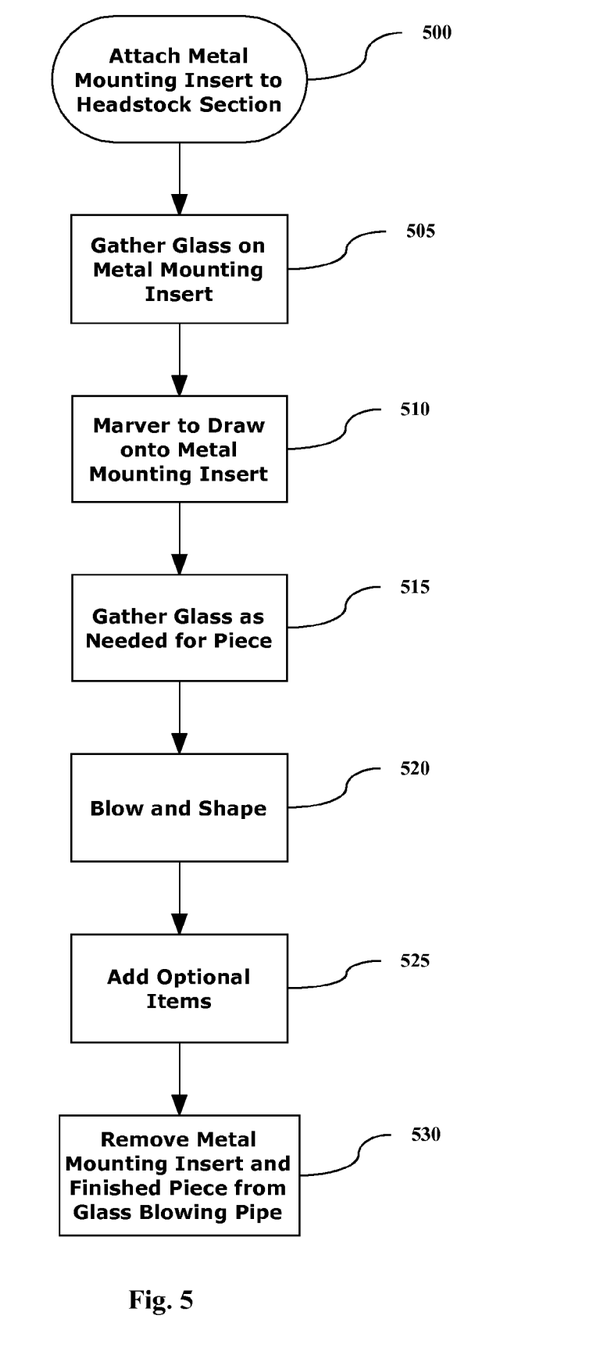
FIG. 5 is a flow chart of a method of blowing glass in accordance with one embodiment of the present invention.

A further embodiment of the present invention comprises a method of manufacturing glass pieces using a glass blowing pipe 100 and the metal mounting insert 115 described above. The method is described in the flowchart of FIG. 5. In a first step 500, the metal mounting insert 115 is attached to the headstock section 112 of the glass pipe 100. In a second step 505, the metal mounting insert 115 is placed in the furnace and dipped directly into the crucible of molten glass. The molten glass gathers directly onto the metal mounting insert 115. In a subsequent step 510, once a sufficient amount of molten glass has been gathered upon the metal mounting insert 115, the metal mounting insert 115 is rolled on a marver to ensure full and solid contact between the molten glass and the metal mounting insert 115 and to achieve desired shape. In a subsequent step 515, additional molten glass is collected if necessary for a particular piece. In another step 520, the glass piece is blown using the glass pipe 100. In an optional step additional metal mounting insert's or spray inserts may be added to the finished glass piece. In a final step 520, once the piece is finished it is unscrewed from the pipe with the metal mounting insert 115 permanently attached.

Figure 6A:
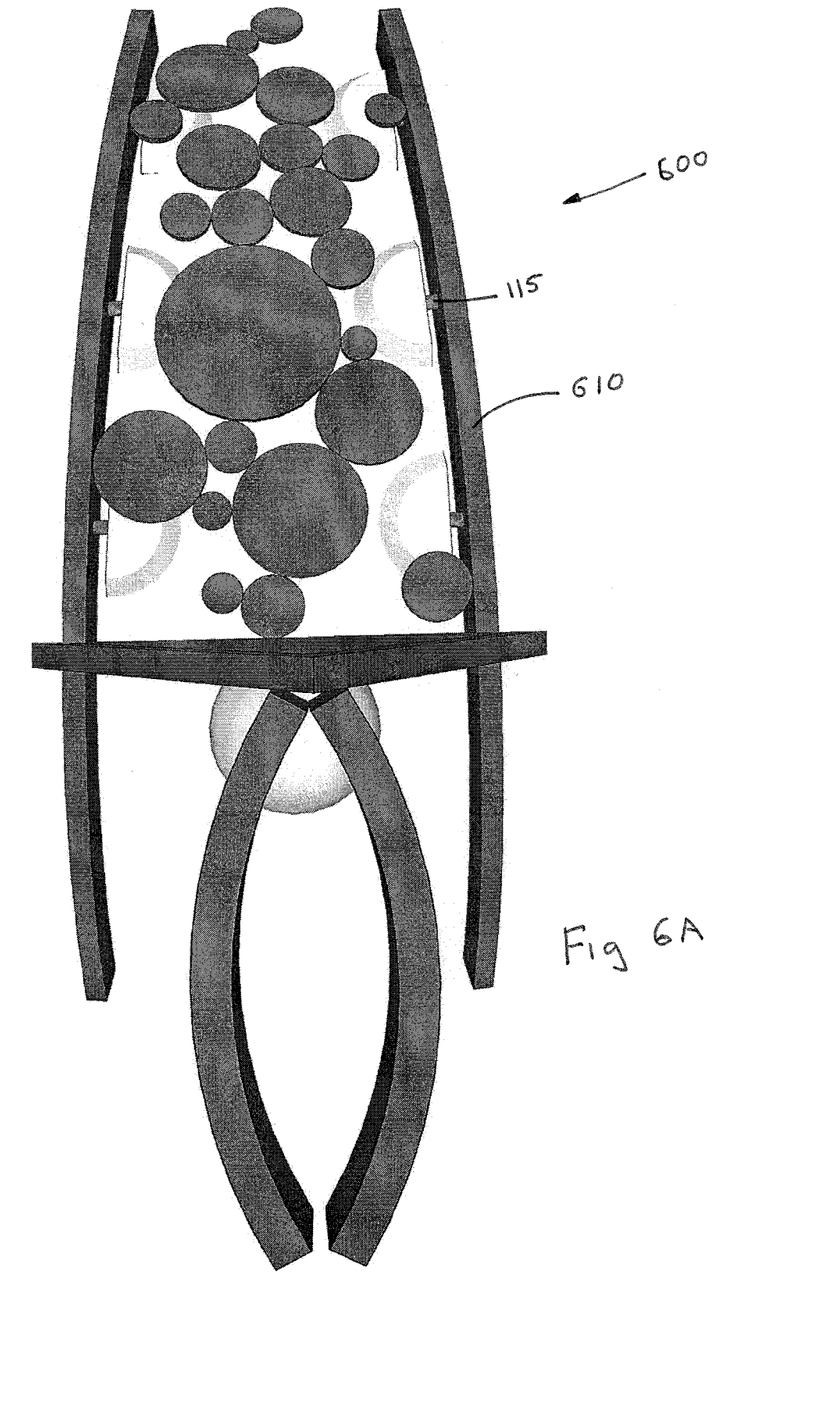
FIGS. 6A & 6B are illustration of various glass pieces attached to frames to form functional products.
Figure 6B:
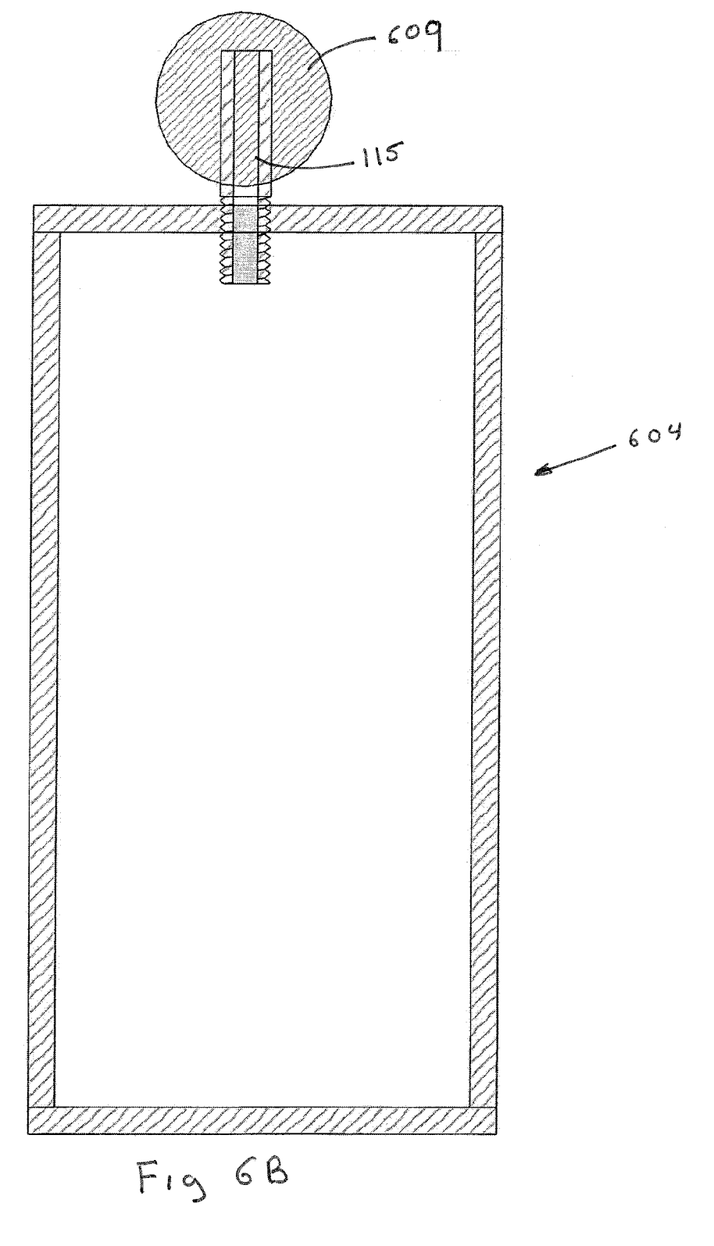

In a preferred embodiment of the present invention, as shown on FIG. 6A, the completed piece is attached to a frame 610 to form a complex piece 600 with multiple individual pieces. The metal mounting insert 115 enables the piece to be attached to the frame 610 on any direction. In some embodiments, the piece is perpendicular to the frame 610. In other embodiments the piece is placed on the frame 610 at various different angles. The metal mounting insert 115 may also be used to secure the glass blown object 609 to a mounting bracket 604 as shown in FIG. 6B. In other embodiments, after the glass blown object 609 is attached to the mounting bracket 604, an accessory is attached to the metal mounting insert 115. By way of non-limiting example, the accessory can be a water coupling. The water coupling can be utilized to provide water to the glass blown object.

Figure 7:
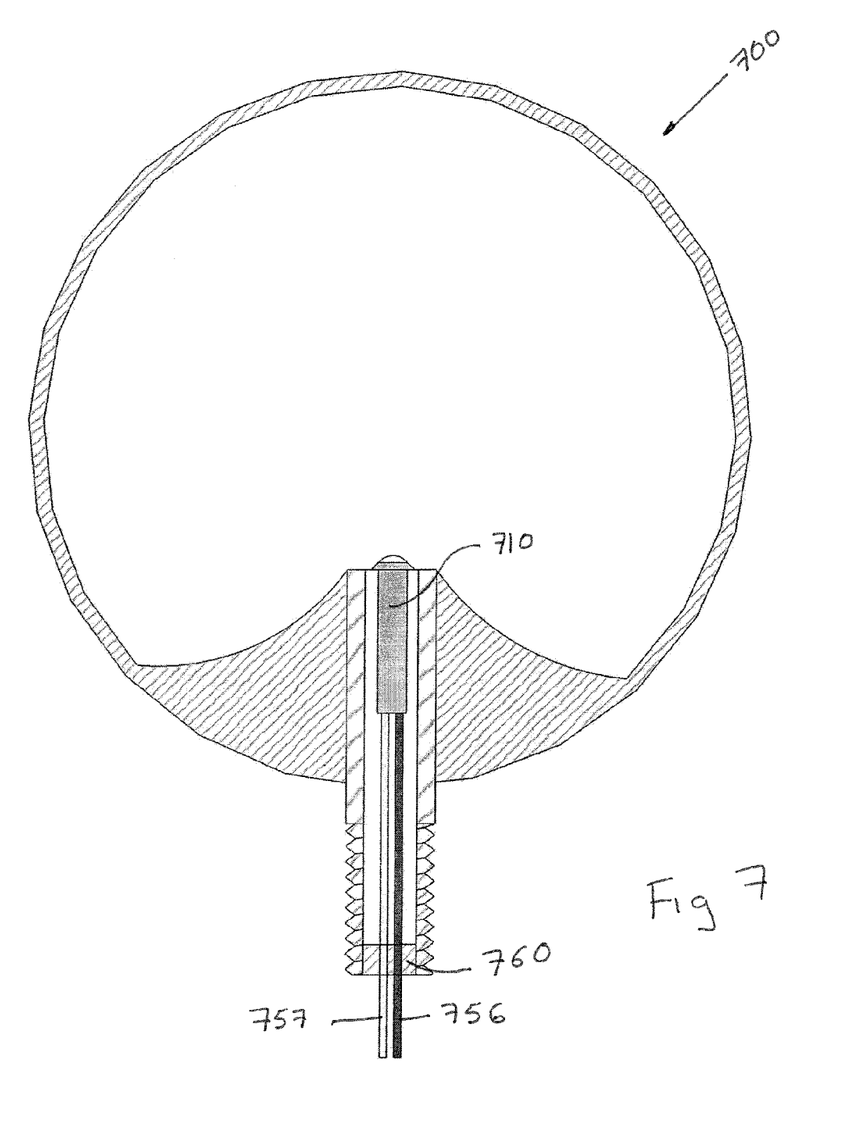
FIG. 7 is an illustration of a metal mounting insert that includes lighting elements.

In another preferred embodiment, the metal mounting insert 115 is configured to fit a lighting element 710 as shown on FIG. 7. The lighting element 710 allows the glass blown piece 700 to be lit from the inside. Lighting elements include, but are not limited to, incandescent light bulbs, light emission diodes (LEDs), fluorescent light bulbs, Neon, high intensity discharge light bulbs, and other light emitting components as understood by a person of ordinary skill in the art. The light element 710 has a positive 757 and a negative 756 wire that enables electricity to be used in lighting the element 710. In some embodiments a stopper 760 is used to secure the wires 757 and 756 and to prevent moisture to enter the metal mounting insert. In other embodiments, the metal mounting insert 115 is utilized to introduce other elements inside the glass piece.

Figure 8A:
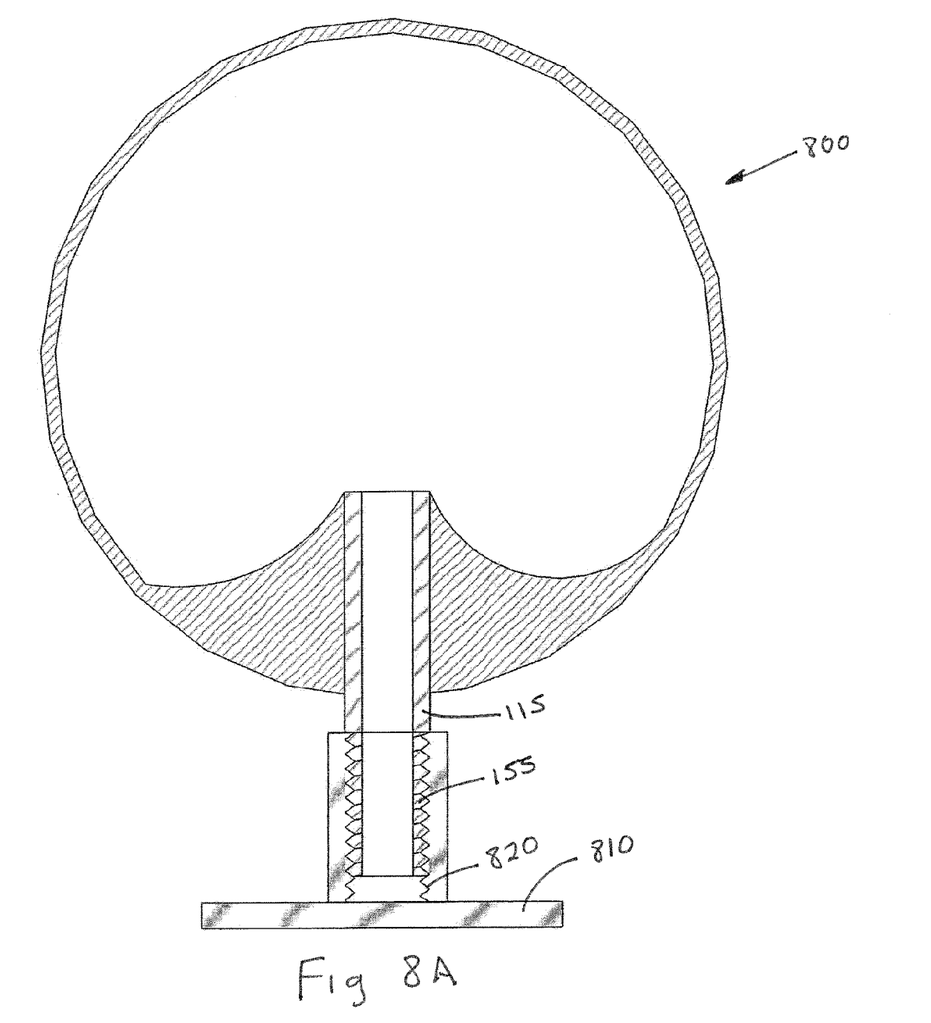
FIGS. 8A and 8B is an illustration of a glass object attached to a mount and secured by threads on the mount or a set screw.
Figure 8B:
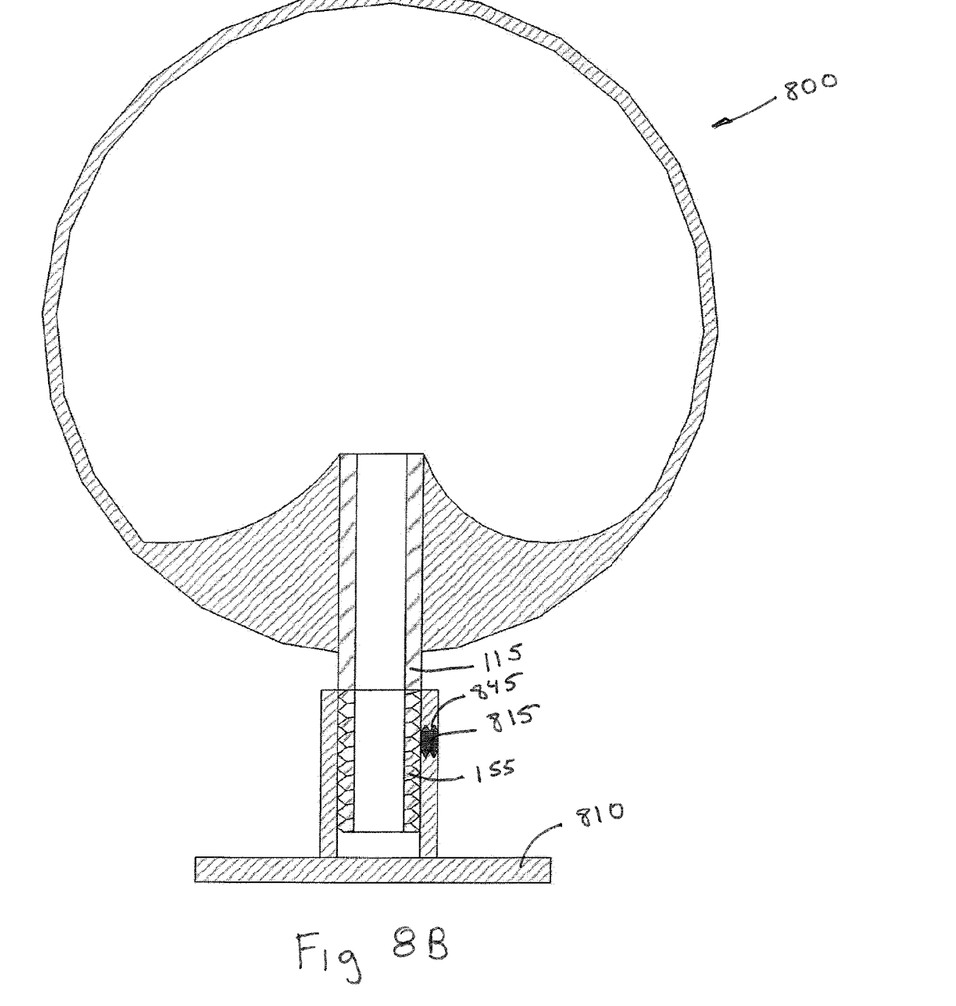

FIGS. 8A and 8B show a metal mounting insert 115 attached to a glass blown object 800, where the metal mounting insert 115 is attached to a mount 810. In some embodiments, as shown in FIG. 8A the mount 810 has threads 820 that match the metal mounting insert 115 threads 155 so that the metal mounting insert 115 and glass blown object 800 can be screwed to the mount 810. In other preferred embodiments, as shown in FIG. 8B, the mount 810 does not have threads 820. Instead, the mount 810 is configured to accept a set screw 815, through a set screw opening 845. The set screw 815 can be tightened to secure the metal mounting insert 115 to the mount 810. In some embodiments the glass blown object shown in FIGS. 8A and 8B has a light emitting diode 710 can be inserted through the opening in the metal mounting insert 115. It is contemplated that other accessories can be inserted through the opening in the metal mounting insert 115 that is mounted to the mount 810. In yet a further embodiment, the mount 810 has threads 820 and a set screw 815, which allows for further securing the metal mounting insert 115.

Figure 9:
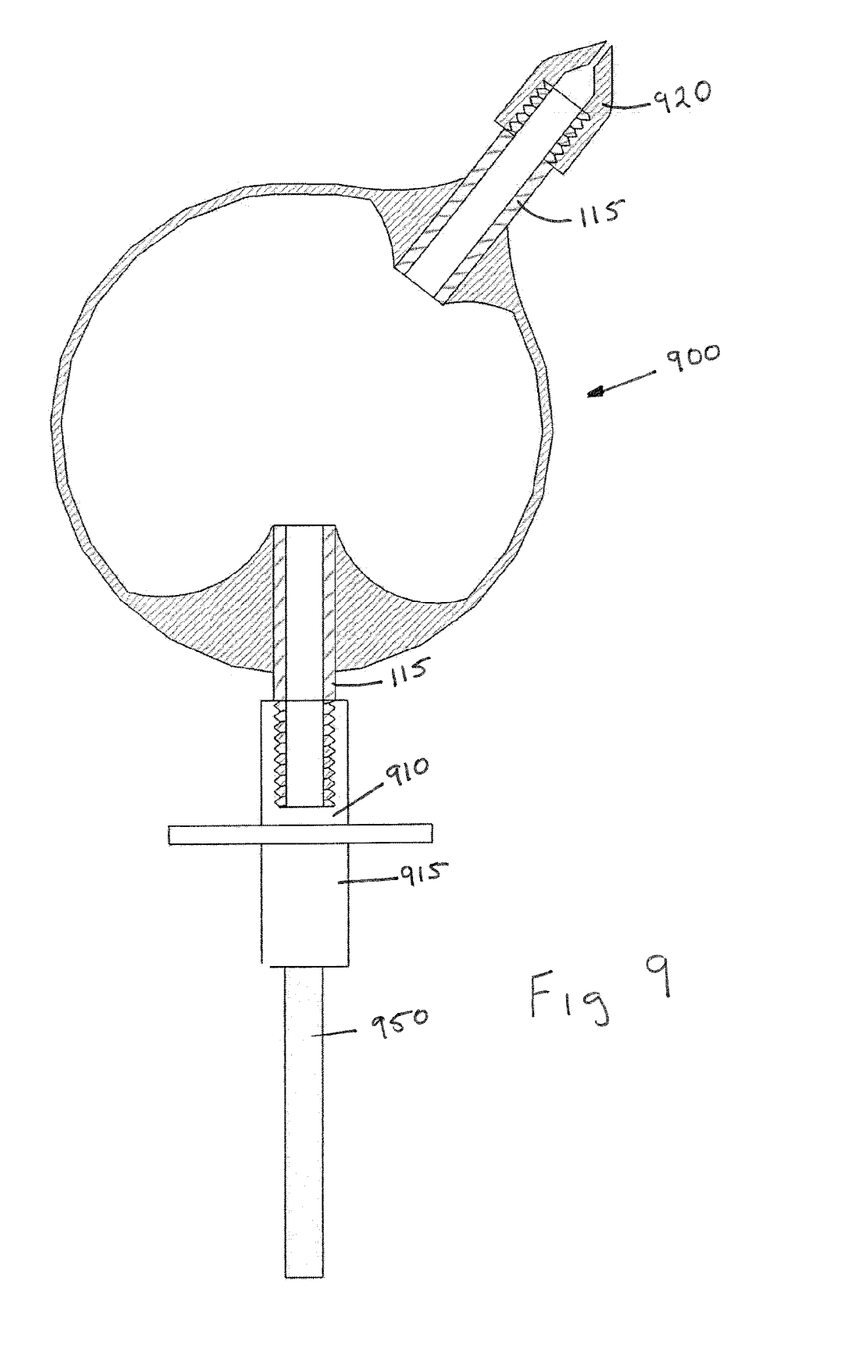
FIG. 9 is an illustration of a glass object having more than one metal mounting insert.

In yet a further embodiment of the present invention, two or more metal mounting inserts 115 can be used, as shown in FIG. 9. A first metal mounting insert 115 is placed on one side of the glass blown object 900 and a second metal mounting insert 115 is placed on a different place in the glass blown object, 900. The first metal mounting object may include a metal mounting accessory 920. The metal mounting accessory 920, in some embodiments, may include ornamental features or functional features. In one embodiment, the metal mounting accessory is a water spout. The glass blown object 900, in some embodiments is attached to a mount 910 that, in turn, is attached to a coupling 915 for a water pipe 950. Water passes from the water pipe 950 to the glass blown object 900, and out through the metal mounting accessory 920.

Figure 10:
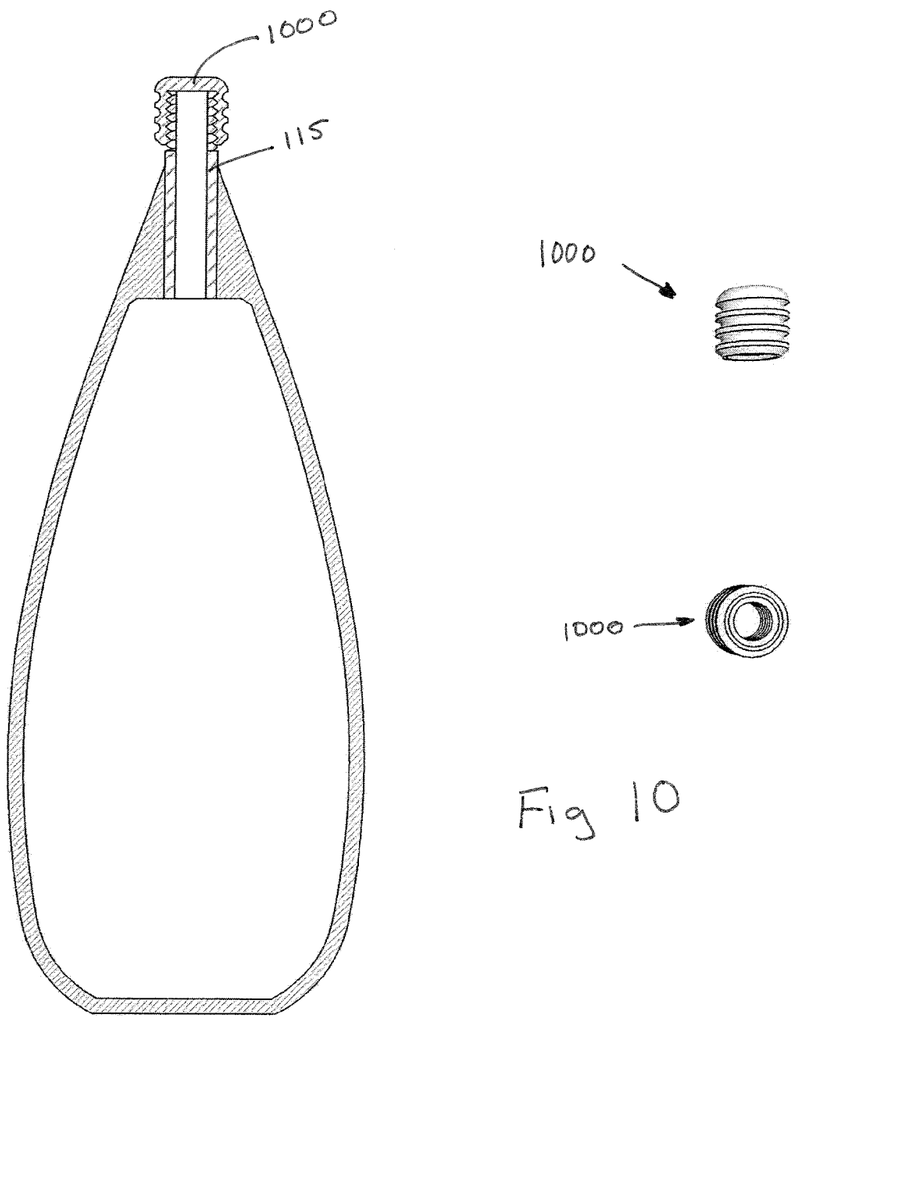
FIG. 10 is an illustration of a glass object having a cap attached to the metal mounting insert.

In yet further embodiments of the present invention, as shown on FIG. 10, a cap 1000 can be screwed to the metal mounting insert 115. It is contemplated that other accessories may be added to the metal mounting insert.

In yet a further embodiment of the present invention, a kit for manufacturing glass blown objects comprises a glass blowing pipe and a metal mounting insert. In further embodiments, the kit contains a metal mounting object removal tool. In yet further embodiments, the kit comprises accessories, mounts, mounting brackets and other components described above to manufacture glass pieces with a metal mounting insert.

Figure 11:
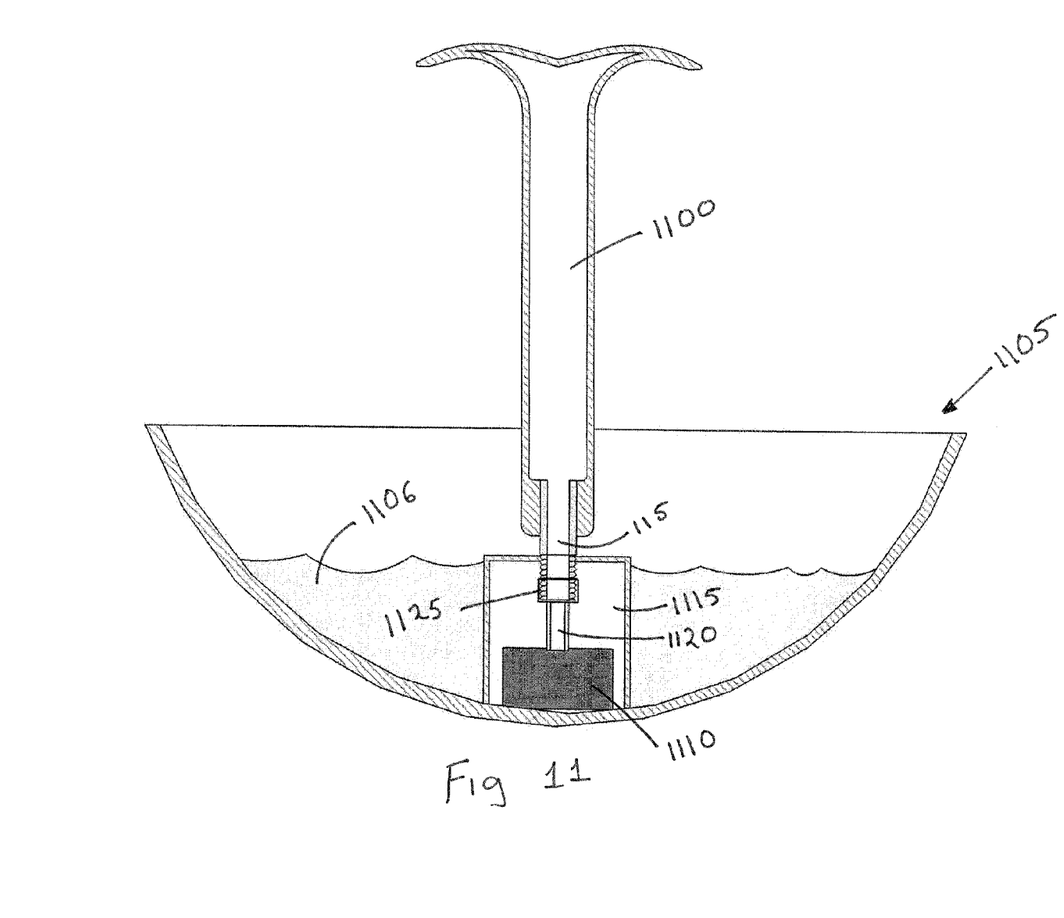
FIG. 11 is an illustration of a glass object mounted to a metal housing and coupled to a water pump.

In yet further embodiments of the present invention a glass blown object 1100 has a metal mounting insert 115 as shown on FIG. 11. The metal mounting insert 115 connects with a coupler 1125. The coupler 1125 is attached to a water pump 1110 through a supply tube 1120. The water pump 1110 is attached to a vessel 1105 in a housing 1115, which in some embodiments is a metal casing. When the glass blown object 1100 is connected to the coupler, water 1106 is pumped through glass blown object 1100 and falls on the vessel creating a fountain where water 1106 is recirculated.

Figure 12:
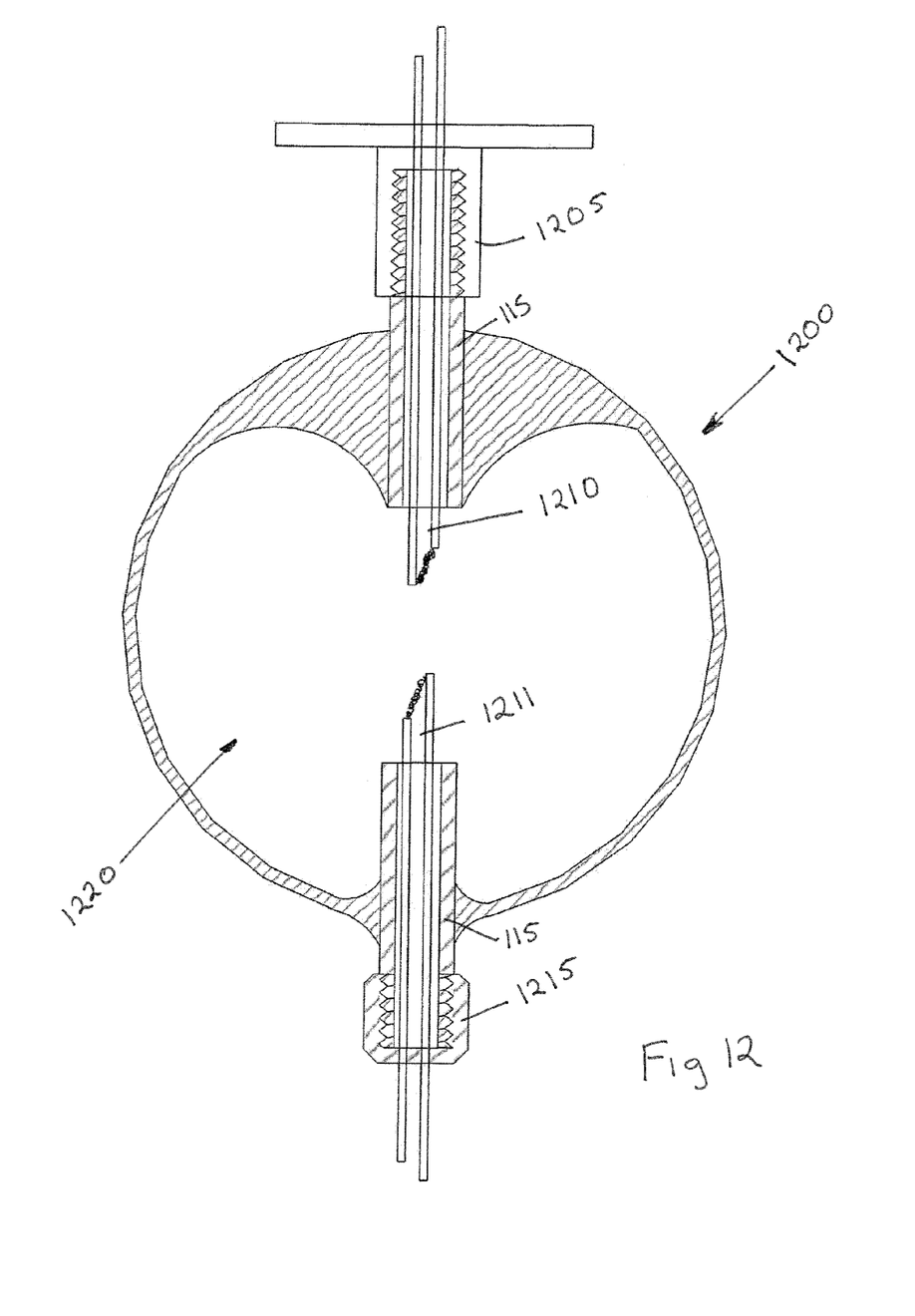
FIG. 12 is an illustration of a glass object with two metal mounting inserts to create a neon or fluorescent light.

In yet further embodiments of the present invention, as shown on FIG. 12, light emitting object 1200 is made by adding two metal mounting inserts 115 to a glass blown object. A first metal mounting object 115 has an anode 1211. The second metal mounting object 115 has a cathode 1210. One metal mounting object 115 has a cap 1215 and the other may connect to a socket 1205 that allows electricity to be passed through the anode 1211. The light emitting object 1200 is vacuum sealed and includes a gas 1220 that produces light when electricity is applied to the anode 1211 and cathode 1210.

It is contemplated that the metal mounting insert can be utilized in a traditional glass blowing pipe or any other device that allows for blowing glass objects either by hand or automatically. When the metal mounting insert is attached to an automatic blowing device, the metal mounting insert is removed from the blowing device and remains as part of the glass blowing object.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A device, comprising:
   a glassblowing pipe, comprising a headstock and a mouthpiece; and
   a detachable metal mounting device that attaches to the headstock, comprising a headstock attachment element;
      a glass attachment element, wherein the glass attachment element comprises a material that melts with the glass upon heating and secures said glass upon cooling.

2. The device of claim 1, wherein the headstock attachment element is configured to allow the metal mounting device to be removably attached to a headstock section of a glassblowing pipe.

3. The device of claim 2, wherein the headstock attachment element further comprises a release element.

4. The device of claim 3, wherein the release element comprises an aperture.

5. The device of claim 1, wherein at least the glass attachment element is made of a metal selected from the group consisting of copper, silver, or gold.

6. A method comprising the steps of:
   gathering molten glass on a metal mounting device of claim 1; and
   blowing a glass piece using the device of claim 1.

7. The method of claim 6, further comprising the step of removing the glass piece from a glass blowing pipe.

8. The method of claim 6, further comprising the step of attaching the glass piece to a mount.

9. The method of claim 6, further comprising attaching accessories to the glass piece.

10. The method of claim 9, wherein the accessory is a light element.

11. The method of claim 10, wherein the light element is a light emitting diode.

12. The method of claim 6 further comprising the step of assembling multiple glass pieces having metal mounting devices to form a complex structure.

\* \* \* \* \*